United States Patent
Schimpf et al.

(10) Patent No.: US 9,518,643 B2
(45) Date of Patent: Dec. 13, 2016

(54) AXLE DIFFERENTIAL TRANSMISSION FOR AN ENGAGEABLY DRIVEN VEHICLE OF A MOTOR VEHICLE

(71) Applicant: Schaeffler Technologies AG & Co. KG, Herzogenaurach (DE)

(72) Inventors: Ralph Schimpf, Fuerth (DE); Franz Kurth, Nuremberg (DE); Thorsten Biermann, Wachenroth (DE); Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/803,720

(22) Filed: Jul. 20, 2015

(65) Prior Publication Data
US 2016/0010736 A1    Jan. 14, 2016

Related U.S. Application Data

(63) Continuation-in-part of application No. 14/327,096, filed on Jul. 9, 2014, now abandoned.

(51) Int. Cl.
| | |
|---|---|
| *F16H 48/20* | (2012.01) |
| *F16H 48/22* | (2006.01) |
| *F16H 48/295* | (2012.01) |
| *B60K 17/16* | (2006.01) |
| *B60K 17/344* | (2006.01) |
| *B60K 23/08* | (2006.01) |

(Continued)

(52) U.S. Cl.
CPC ............ *F16H 48/22* (2013.01); *B60K 17/165* (2013.01); *B60K 17/344* (2013.01); *B60K 23/08* (2013.01); *F16H 48/295* (2013.01); *F16H 48/11* (2013.01); *F16H 2048/106* (2013.01); *F16H 2048/343* (2013.01)

(58) Field of Classification Search
None
See application file for complete search history.

(56) References Cited

U.S. PATENT DOCUMENTS

| | | | | |
|---|---|---|---|---|
| 7,361,117 | B2* | 4/2008 | Yamazaki | ............... F16H 48/10 475/249 |
| 8,666,628 | B2* | 3/2014 | Noguchi | ............. B60W 10/119 701/72 |
| 2015/0330493 | A1* | 11/2015 | Pritchard | ................ F16H 48/32 475/86 |

FOREIGN PATENT DOCUMENTS

| | | | | |
|---|---|---|---|---|
| AT | DE 19618495 | A1 * | 11/1996 | ............. F16H 48/08 |
| DE | 102008037886 | A1 | 2/2010 | |
| DE | 102008037885 | A1 | 3/2010 | |

* cited by examiner

*Primary Examiner* — Dirk Wright
(74) *Attorney, Agent, or Firm* — Simpson & Simpson, PLLC

(57) ABSTRACT

An axle differential transmission, including: a housing; a differential stage including at least one planetary gear assembly; an input shaft connected to the at least one planetary gear assembly; and a clutch assembly including an actuator, at least one first clutch plate non-rotatably connected to the input shaft, at least one second clutch plate non-rotatably connected to the housing, and a one-way clutch including at least one wedge clutch plate. For a initial drive mode, the actuator is arranged to compress the at least one first clutch plate, the at least one second clutch plate, and the at least one wedge clutch plate to non-rotatably connect the housing and the input shaft. For a final drive mode, relative rotation between the housing and the input shaft in a first circumferential direction is arranged to non-rotatably connect the housing, the input shaft, and the at least one wedge plate.

20 Claims, 4 Drawing Sheets

(51) Int. Cl.
*F16H 48/10* (2012.01)
*F16H 48/11* (2012.01)
*F16H 48/34* (2012.01)

AXLE DIFFERENTIAL TRANSMISSION FOR AN ENGAGEABLY DRIVEN VEHICLE OF A MOTOR VEHICLE

CROSS-REFERENCE TO RELATED APPLICATIONS

This is a continuation-in-part patent application under 35 USC 120 of U.S. patent application Ser. No. 14/327,096, filed Jul. 9, 2014, which application claims priority to German Patent Application No. DE102013215888.2, filed Aug. 12, 2013, which applications are hereby incorporated by reference in their entirety.

FIELD OF THE INVENTION

The invention relates to an axle differential transmission for an engageably driven vehicle axle, which has two shaft ends and is part of a motor vehicle, wherein said axle differential transmission comprises a clutch assembly, which is integrated in a transmission case between a drive shaft and a housing input shaft of a differential stage, for selectively connecting a drive to the vehicle axle.

BACKGROUND OF THE INVENTION

The trend towards increasingly smaller and lighter four-wheel drive vehicles is leading to four-wheel drive systems, in which the drive power is transmitted, according to specific requirements, from a primary driven front axle to a secondary driven rear axle by means of a clutch. For this purpose an axle differential transmission with engageable drive power of the kind that is of interest herein can be used in the area of the rear axle.

In most cases a clutch assembly is integrated directly in the transmission case between the transmission input shaft, which is disposed on the rear axle along the vehicle for transmitting the driving torque from the front axle to the rear axle, and the input shaft of the differential transmission for a rear axle engagement of the drive. The multiple disk clutch, which is usually designed to cope with the axle torque, is arranged between the crown wheel on the transmission input side and the differential stage. This arrangement makes it possible to disengage the differential with the side shafts from the hypoid drive in the shut down mode. In addition, this arrangement permits a compact design of the rear axle and makes it possible to gain additional design space in the area of the longitudinally arranged transmission input shaft. However, the field of application of the invention is not limited to just an engageably driven rear axle of a vehicle alone. It is also conceivable to assign an axle differential transmission of the type that is of interest here to the front axle of a motor vehicle or to the central axle, provided that the objective is to apply a drive power, which can be engaged on demand, to these axles.

DE 10 2008 037 886 A1 discloses a technical solution for switching off the four-wheel drive at the axle differential transmission of the rear axle of a vehicle. The drive assembly comprises a transfer case, which is assigned to the front axle of the vehicle and which distributes a torque, which is introduced by the drive unit of the motor vehicle, to a first drive train and to a second drive train, wherein the first drive train is permanently drive-connected to the transfer case, in order to transmit a torque to the front axle of the vehicle. In contrast, the second drive train is engageably connected to the transfer case, in order to also transmit a torque to the rear axle of the vehicle, for which purpose a longitudinal drive shaft transmits the torque flow between the transfer case and the rear axle of the vehicle. Within the framework of the drive assembly there are provided first clutch means for coupling and uncoupling the longitudinal drive shaft relative to the drive unit of the motor vehicle as well as second clutch means for coupling and uncoupling the longitudinal drive shaft relative to the rear axle of the vehicle.

To date the second clutch means, which is of interest here and which may be found at the engageably driven axle of a vehicle, has consisted, in principle, of a friction clutch, which is constructed from clutch plates. In this case the friction clutch makes it possible to transmit the torque by means of an axially oriented actuator by pressing the clutch plates against each other.

DE 2008 037 885 A1 discloses an additional solution for the clutch means for an engageably driven vehicle axle in a motor vehicle driven by multiple axles. These clutch means also comprise an externally controllable friction clutch with a clutch input member, which can be driven in such a way that it rotates about an axis of rotation, and with a clutch output member. The clutch means also comprise a differential transmission with an input element and two output elements, which are drive-connected to the input element, wherein this input element of the differential transmission is arranged coaxially to the clutch output member and is driveably connected to the clutch output member, in order to transmit a torque.

In these solutions known from the prior art, the friction clutch in the engageable four-wheel drive is under constant strain. This applies, in particular, to the bearings of the ramp actuators that are often used for actuating the clutch, because in order to transmit the torque, the axial force, which is generated by the actuator, on the clutch plates, has to be maintained. The net result is that there are a plurality of clutch plates that are relatively large in size and an actuator that is dimensioned accordingly.

BRIEF SUMMARY OF THE INVENTION

According to aspects illustrated herein, there is provided an axle differential transmission for an engageably driven vehicle axle, including: an axis of rotation; a housing; a differential stage including at least one planetary gear assembly; an input shaft connected to the at least one planetary gear assembly; and a clutch assembly including an actuator, at least one first clutch plate non-rotatably connected to the input shaft, at least one second clutch plate non-rotatably connected to the housing, and a one-way clutch including at least one wedge clutch plate. For a initial drive mode, the actuator is arranged to compress the at least one first clutch plate, the at least one second clutch plate, and the at least one wedge clutch plate to non-rotatably connect the housing and the input shaft. For a final drive mode, relative rotation between the housing and the input shaft in a first circumferential direction is arranged to non-rotatably connect the housing, the input shaft, and the at least one wedge plate.

According to aspects illustrated herein, there is provided an axle differential transmission for an engageably driven vehicle axle, including: an axis of rotation; a housing; a differential stage including at least one planetary gear assembly; an input shaft connected to the at least one planetary gear assembly; and a clutch assembly including a mechanical ramp actuator, at least one first clutch plate non-rotatably connected to the input shaft, at least one second clutch plate non-rotatably connected to the housing, and a one-way clutch including at least one wedge clutch plate. For a initial drive mode, the actuator is arranged to compress the at least one first clutch plate, the at least one second clutch plate, and the at least one wedge clutch plate to non-rotatably connect the housing and the input shaft. For a final drive mode, relative rotation between the housing and the input shaft in a first circumferential direction is arranged to non-rotatably connect the housing, the input shaft, and the at least one wedge plate.

According to aspects illustrated herein, there is provided an axle differential transmission for an engageably driven vehicle axle, including: a housing; an input shaft; and a clutch assembly including: an actuator; at least one first clutch plate non-rotatably connected to the input shaft; at least one second clutch plate non-rotatably connected to the housing; and a one-way clutch including at least one wedge clutch plate. For a initial drive mode, the actuator is arranged to compress the at least one first clutch plate, the at least one second clutch plate, and the at least one wedge clutch plate to non-rotatably connect the housing and the input shaft up to a predetermined amount of torque transmitted by the housing. For a final drive mode and the predetermined amount of torque, relative rotation between the housing and the input shaft in a first circumferential direction is arranged to non-rotatably connect the housing, the input shaft, and the at least one wedge plate.

The invention includes the technical teaching that the clutch assembly comprises clutch plates and a one-way clutch, in order to transmit the driving torque, generated by the drive shaft in the torque transmission direction of the one-way clutch that corresponds to a forward direction of travel of the motor vehicle, to the differential stage, as soon as this differential stage is above a defined limit torque and the driving torque is distributed in equal parts to the shaft ends of the vehicle axle.

In other words, the one-way clutch, which is integrated into the clutch assembly, is used to transmit the peak torque in a drive direction, for example, the forward direction of travel. The solution according to the invention enables a smooth engagement of the four-wheel drive in the forward direction of travel by at least partially actuating the clutch, so that the jerky engagement of the freewheel unit is damped. The clutch plates enable a first synchronization, before the entire torque is transmitted by means of the one-way clutch to the differential stage and then by way of said differential stage to the vehicle axle. Since the one-way clutch takes over the torque transmission in the range of the high torque levels, the load on the clutch assembly is reduced, because the one-way clutch does not engage suddenly and abruptly. Instead, the one-way clutch is slowed down by means of a slight actuation of the clutch. As a result, the contact forces for the clutch plates of the clutch assembly in the forward initial drive mode can be reduced, because only thrust moments are absorbed by way of the clutch assembly. However, in the reverse travel mode, the contact force of the clutch assembly has to be increased; or, as an alternative, the torque has to be reduced compared to the forward travel mode.

By just closing the clutch plates alone the clutch assembly transmits the driving torque to the differential stage in a freewheeling direction of the one-way clutch corresponding to a reverse direction of travel of the motor vehicle. Therefore, for example, while the engagement of the four-wheel drive at the axle differential in the forward direction of travel is carried out, in principle, by means of the one-way clutch, the engagement in the reverse direction of travel is carried out by means of an actuation of the friction clutch.

In an example embodiment, a mechanical ramp actuator is provided for closing the clutch plates. For this purpose the ramp actuator comprises two actuator shafts, which are designed as hollow shafts and which are arranged coaxially to the housing input shaft of the differential stage. Such a ramp actuator can be integrated into the transmission case in such a way that the design envelope is reduced. As an alternative, it is also possible to use, for example, a hydraulic actuator for actuating the clutch. The clutch plates are closed preferably by means of a hydraulically operated cylinder.

In an example embodiment, the one-way clutch opens upon elimination of the driving torque, generated in the forward direction of travel of the motor vehicle, on the transmission input shaft. The result is an opening of the freewheel on stoppage of the driven transmission input shaft, which is arranged longitudinally, and with a simultaneous thrust moment by way of the axle of the vehicle. Thus, the one-way clutch is released with the elimination of the drive owing to the clutch arrangement.

BRIEF DESCRIPTION OF THE DRAWINGS

Additional features that improve the invention are explained in detail below together with the description of a preferred exemplary embodiment of the invention with reference to the figures, where.

DETAILED DESCRIPTION OF THE INVENTION

Figures 1, 2:
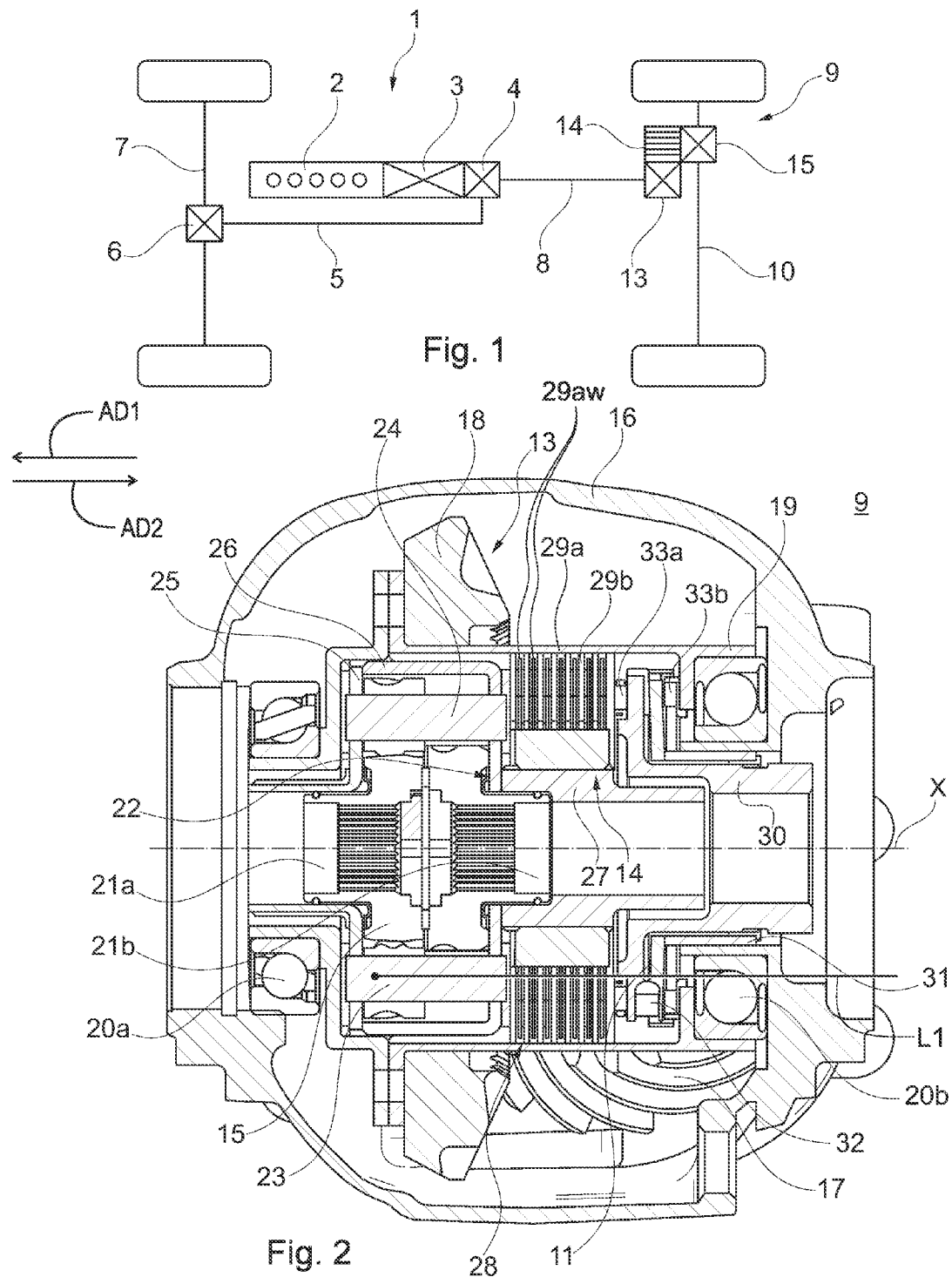
FIG. 1 is a schematic diagram of a two-axle, four-wheel drive vehicle with an engageably driven axle of the vehicle.
FIG. 2 is a longitudinal view of an axle differential transmission for the engageably driven axle of the vehicle from FIG. 1 with an integrated clutch assembly.

According to FIG. 1, the drive train 1 of a motor vehicle, which is not shown in detail, consists of a front axle 7 of a motor vehicle, wherein this front axle is driven by way of a transfer case 4 by means of an internal combustion engine 2 of the motor vehicle. Said drive train also consists of a rear axle 10 of a motor vehicle, wherein said rear axle is engageably driven by means of an axle differential transmission 3.

In this context the front axle 7 of the motor vehicle is permanently driven, starting from a transfer case 4 and, upstream of said transfer case, a main transmission 3, by means of a front axle differential 6 and a front drive shaft 5.

The rear axle differential transmission 9 is driven by means of a second shaft, which is arranged downstream of the transfer case 4 and which is referred to herein as the rear drive shaft 8. This rear axle differential transmission transmits in an engageable manner a proportional torque in equal parts to the shaft ends of the rear axle 10 of the motor vehicle.

The rear axle differential transmission 9 comprises an angular drive 13, a clutch assembly 14 and a differential stage 15, which applies the driving torque in equal parts to the two shaft ends of the rear axle 10 of the motor vehicle. The clutch assembly 14, which is disposed between the angular drive 13 and the differential stage 15, is used to couple or interrupt the torque flow between the transfer case 4 and the rear axle 10 of the motor vehicle.

According to FIG. 2, the angular drive 13, the clutch assembly 14 and the differential stage 15 of the rear axle differential transmission 9 are housed in a common first transmission case 16.

The angular drive 13 comprises a pinion 17, which is connected in a rotationally rigid manner to the rear drive shaft 8; a driving gear 18; and a housing 19, which is mounted in a first transmission case 16 by means of two bearings 20a, 20b in such a way that said housing can be rotated in relation to a transmission axis X. The term angular drive refers to the fact that the pinion 17 transmits the driving torque at a fixed ratio to the driving gear 18 by means of a suitably designed gear tooth system, as a result of which a central axis of the pinion 17 is oriented at an angle of about 90° to the central axis of the driving gear 18.

The differential stage 15 comprises two output sun gears 21a, 21b and a planetary gear assembly, which is accommodated in a housing 22, for coupling the two output sun gears 21a, 21b in such a way that they can move in a rotational manner in the opposite direction. The planetary gear assembly comprises a first planet 23 and a second planet 24, each of which is arranged on a periphery of the respective output sun gear 21a or 21b; and both planets are operatively connected to each other. In this respect the first planet 23 is in contact with the output sun gear 21a, while the second planet 24, which is about twice as long as the first planet 23 and covers the width of the gear tooth system of the output sun gears 21a, 21b, is in contact with the output sun gear 21b. The gear ratio of the geared coupling, existing between the output sun gears 21a, 21b, amounts to −1. The output sun gears 21a, 21b are connected to the shaft ends of the rear axle 10 of the motor vehicle. The housing 22 has a housing cover 25, a housing cup 26 and a housing input shaft 27, all of which are rigidly connected to each other. The housing input shaft 27 is connected to the housing cup 26 by means of friction welding.

The clutch assembly 14 includes clutch plate pack 28 and actuator 11. Clutch pack 28 includes with at least one clutch plate 29a and at least one clutch plate 29b. Hereinafter, at least one clutch plate 29a and at least one clutch plate 29b are referred to as clutch plates 29a and clutch plates 29b, respectively. However, it should be understood that the discussion regarding clutch plates 29a and clutch plates 29b is applicable to a single clutch plate 29a and a single clutch plate 29b, respectively. Clutch plates 29a are non-rotatably connected to input shaft 27 and clutch plates 29b are non-rotatably connected to housing 19. By "non-rotatably connected" we mean that non-rotatably connected components all rotate to some degree whenever one of the components rotates. It is possible for some or all of the components to rotate at different rates, for example, due to slip between components. In this instance, there is essentially no slip between clutch plates 29a and input shaft 27 and between clutch plates 29b and housing 19.

The actuator 11, which actuates the clutch assembly 14, comprises a first actuator shaft 30, which is designed as a hollow shaft, and a second actuator shaft 31, which is also designed as a hollow shaft; and both actuator shafts are arranged coaxially to the transmission axis X. Both actuator shafts 30, 31 exhibit ramp contours, between which a rolling member 32, which is shown herein as a roller, is disposed. The two actuator shafts 30, 31 can be rotated relative to each other about a defined angle, which is a function of the length of the ramps. The maximum theoretical torsion angle of the rolling member 32 is at most 360°. The sides of the two actuator shafts 30, 31 that are opposite the ramp contours are mounted axially between the housing 19 and the clutch plate pack 28 by means of axial needle bearings 33a, 33b in such a way that said actuator shafts can be rotated about the transmission axis X.

In a initial drive mode, the actuator shafts 30, 31 are rotated against each other by means of an actuating unit, which is not shown in detail, and the angular displacement motion causes displacement of shaft 30 in axial direction AD1. The axial displacement of shaft 30 in turn axially displaces clutch plates 29a, 29b, and 29aw in direction AD1 to compress and frictionally engage clutch plates 29a, 29b, and 29aw. The actuating force of actuator 11 increases after a defined angle of rotation of actuator shafts 30, 31; and this actuating force further compresses clutch plates 29a, 29b and generates an increasingly larger frictional force between clutch plates 29a, 29b, and 29aw. This frictional force generates a predefined torque between the clutch plates 29a, 29b, so that the clutch assembly 14 is totally or partially closed. Thus, in the initial drive mode, the frictional engagement of clutch plates 29a, 29b connects housing 19 and input shaft 27 non-rotatably or with some slip.

As further described below, clutch assembly 14 includes one-way clutch 12 with at least one wedge clutch plate 29aw in order to transmit the torque of the angular drive 13 to the subsequent differential stage 15 when the torque of drive 13 exceeds the predefined torque noted above. The torque corresponds to the forward direction of travel of the motor vehicle. The transmission of the torque by way of the locking direction of one-way clutch 12 occurs after torque from drive 13 exceeds the predefined torque, so that in the range of the driving torque at or below the predefined torque the torque transmission by way of the clutch assembly 14 is carried out only by means of the compression of clutch plates 29a, 29b, and 29aw. Because of the axial alignment of clutch plates 29a, 29b, and 29aw, clutch plates 29aw are compressed along with clutch plates 29a, 29b. The axial alignment is shown by line L1, parallel to axis X, which passes through clutch plates 29a, 29b and 29aw.

One-way clutch 12 cannot be actuated in the reverse direction of travel of the motor vehicle. In the corresponding freewheeling direction of one-way clutch 12, the driving torque is transmitted to the differential stage 15 only by closing clutch plates 29a, 29b, because in the freewheeling direction, the locking effect of one-way clutch 12 is cancelled.

Figure 3:
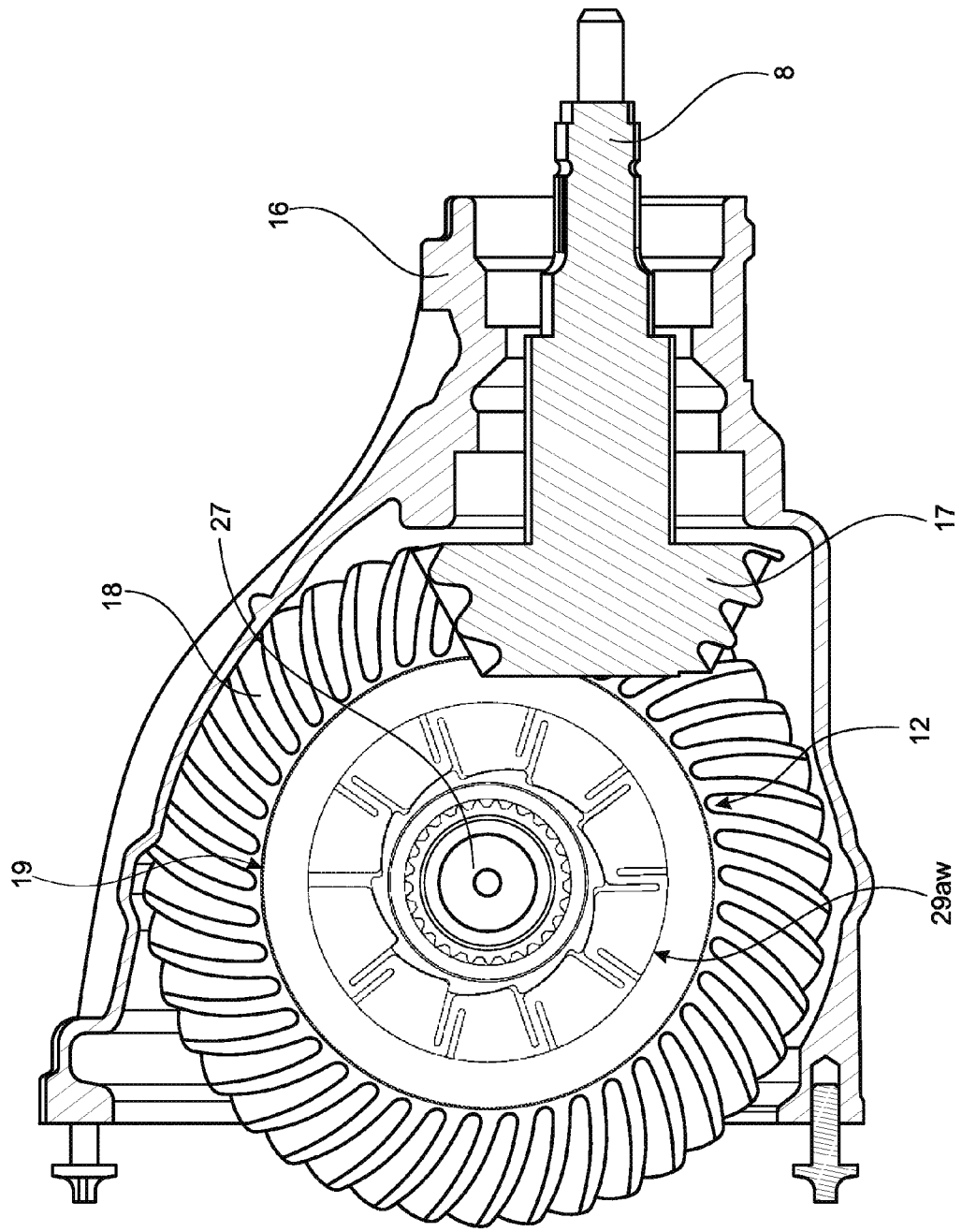
FIG. 3 is a cross sectional view of the axle differential transmission from FIG. 2 in the area of the clutch assembly.

FIG. 3 is a cross sectional view of the axle differential transmission from FIG. 2 in the area of the clutch assembly.

Figure 4:
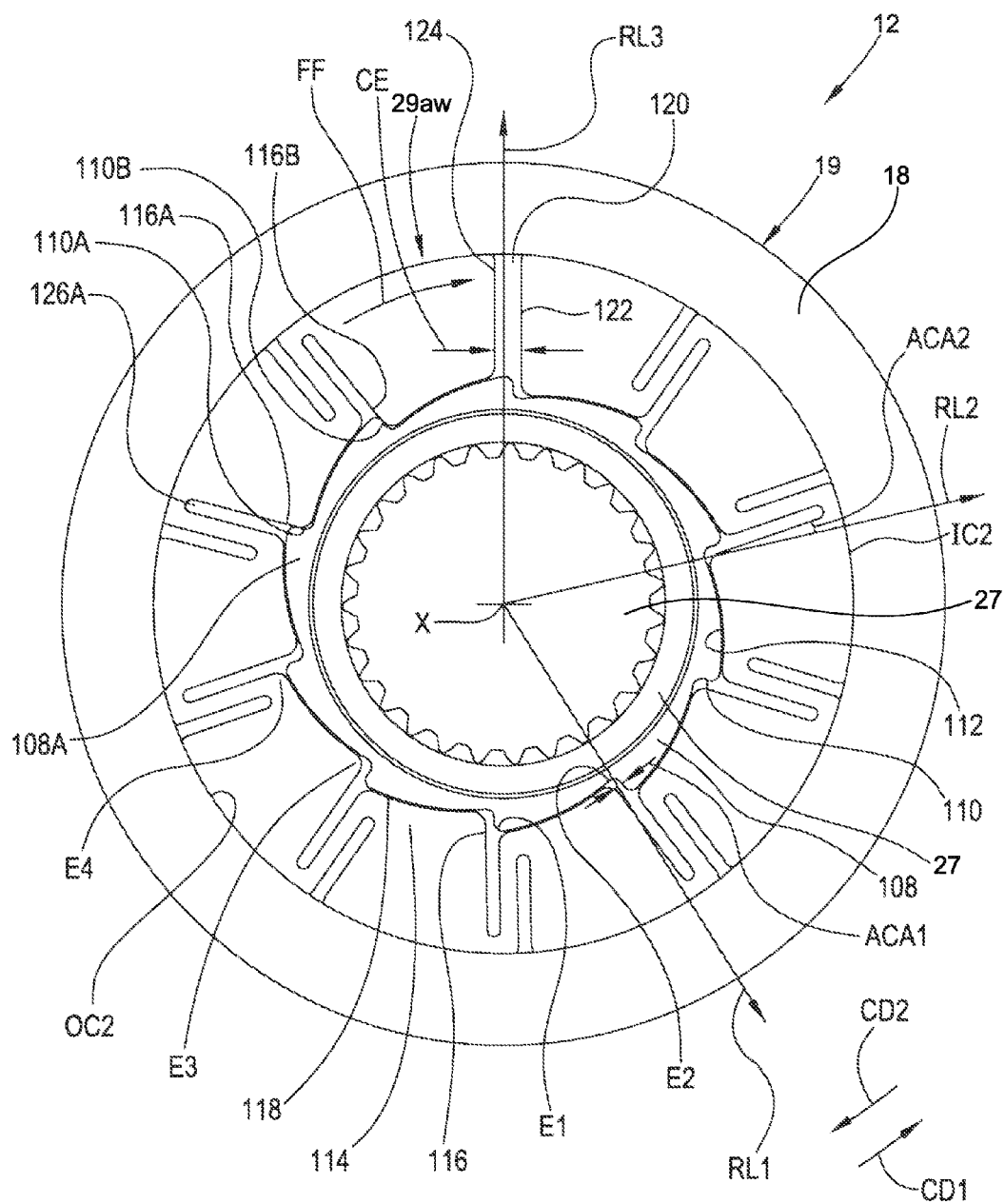
FIG. 4 is a detail of a one-way clutch in a free-wheel mode.

FIG. 4 is a detail of one-way clutch 12 in a free-wheel mode.

Figure 5:
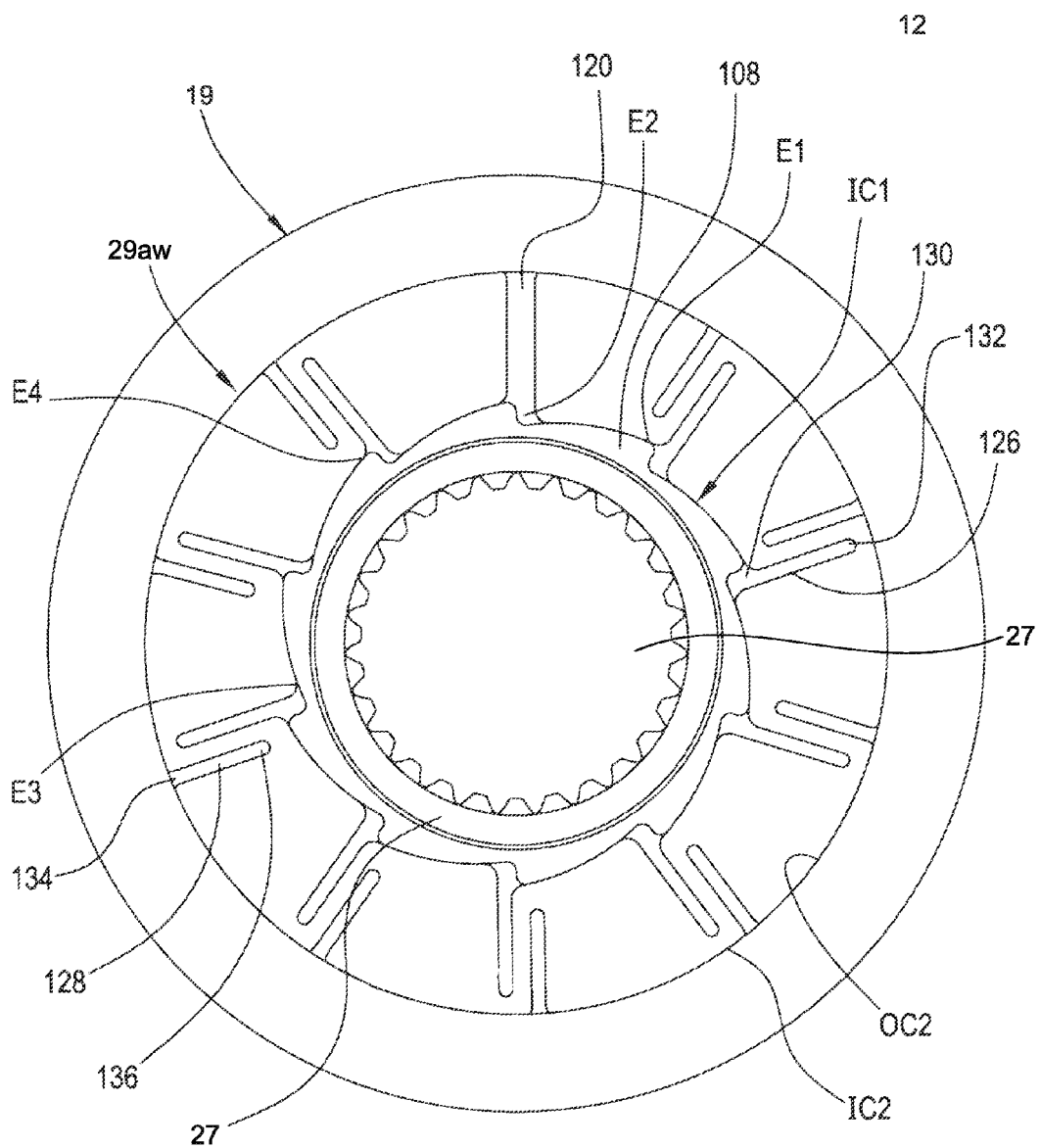
FIG. 5 is a detail of the one-way clutch in a locked mode.

FIG. 5 is a detail of the one-way clutch in a locked mode. The following should be viewed in light of FIGS. 2 through 5. FIGS. 4 and 5 are viewed from the opposing direction to that shown in FIG. 3. At least one clutch plate 29aw is included in one-way clutch 12. Operation of one-way clutch 12, is now be more fully explained.

FIG. 4 is a pared down view of clutch assembly 14 enabling one-way clutch 12 better to be discerned. One-way clutch 12 includes an inner race formed by input shaft 27, at least one wedge clutch plate 29aw, and an outer race formed by housing 19. In an example embodiment, one-way clutch 12 includes two wedge clutch plates 29aw; however, it should be understood that other numbers of wedge clutch plates 29aw are possible. Although wedge clutch plates 29aw are shown in a particular location within clutch assembly 14, it should be understood that wedge clutch plates 29aw are not limited to particular locations within clutch assembly 14. The discussion below is directed to clutch 12 with a plurality of wedge clutch plates 29aw;

however, it should be understood that the discussion is applicable to clutch 12 with a single wedge clutch plate 29*aw*. Input shaft 27 includes outer circumference OC1 with ramps 108 having face surfaces 110 and ramp surfaces 112. Each wedge clutch plate 29*aw* includes smooth outer circumference OC2 and inner circumference IC1 with ramps 114 having face surfaces 116 and ramp surfaces 118. By smooth outer circumference we mean the circumference is a smooth curved line without abrupt changes. For example, the walls of the slots described below and opening to OC2 are not considered part of OC2.

Housing 19 includes inner circumference IC2. For relative rotation of housing 19, with respect to input shaft 27 in circumferential direction CD1 (free wheel or initial drive modes), some, but not all of surfaces 110 are in contact with respective surfaces 116. Note that free wheel mode occurs when plates 29*a* and 29*b* are not compressed with each other and plates 29*wa*. For example, in FIG. 4, surfaces 110A and 110B are in contact with surfaces 116A and 116B, respectively, and the remaining surfaces 110 are free of contact with surfaces 116. In free wheel mode, housing 19 rotates independently of input shaft 27 and wedge clutch plates 29*aw*. In final drive mode, the rotation of housing 19 is locked to the rotation of input shaft 27 by rotation of housing 19 in direction CD2, opposite CD1. In an example embodiment, none of surfaces 110 are in contact with respective surfaces 116 in the final drive mode.

In an example embodiment, surfaces 110 are aligned with a line RL1 orthogonal to axis of rotation AX for One-way clutch 12 or form acute angle ACA1 with RL1. In an example embodiment, surfaces 116 are aligned with a line RL2 orthogonal to axis of rotation AX or form acute angle ACA2 with RL2. Respective ends E1 of ramp surfaces 112 are connected to surfaces 110 and respective ends E2 of ramp surfaces 112 are radially inward of ends E1. In an example embodiment, ends E2 connect to face surface 110 for an adjacent ramp 108. Respective ends E3 of ramp surfaces 118 are connected to surfaces 116 and respective ends E4 of ramp surfaces 118 are radially outward of ends E3. Thus, surfaces 112 and 118 displace radially inward in direction CD1.

Each wedge clutch plate 29*aw* includes radially disposed gap 120 separating ends 122 and 124 of the wedge clutch plate such that the wedge clutch plate is wholly discontinuous in a circumferential direction at the gap. For example, radial line RL3 passes through gap 120 without contacting clutch plate 29*aw*. In general, clutch plate 29*aw* is elastic in a circumferential direction due to gap 120 and diameter D1 for OC2 of clutch plate 29*aw* in a free state (not installed in the outer race) is greater than diameter D2 of IC2 housing 19. Therefore, when clutch plate 29*aw* is installed in housing 19, circumferential extent CE of the gap is reduced and the elasticity of clutch plate 29*aw* urges clutch plate 29*aw* radially outward to contact housing 19 and exert radially outward force F on IC2.

Force FF, opposing rotation of housing 19 in direction CD1, enables the switch from free-wheel mode to initial drive mode and from initial drive mode to final drive mode. A magnitude of force FF is proportional to a magnitude of force F (as F increases, FF likewise increases). The magnitude of F depends on the characteristics of clutch plate 29*aw* (for example, the difference in respective diameters between OC2 and IC2 and the stiffness of the wedge clutch plate) and the location of the pairs of surfaces 110 and 116, in contact. For example, using end 124 as a starting point for contacting pairs of surfaces 110 and 116, the magnitude of F depends on the location of the first pair of surfaces 110 and 116, in contact, encountered when moving in direction CD2 from gap 120. Specifically, the closer the pair of surfaces is to gap 120 in direction CD1, the less the magnitude of F. For example, if surfaces 110A and 116A form the pair, the magnitude of F is less than if surfaces 110B and 116B form the pair.

Thus, in free wheel mode or initial drive mode, the closer the pair of surfaces noted above are to the gap in direction CD1, the less a magnitude of force FF opposing rotation of the outer race in direction CD1. For example, if surfaces 110A and 116A form the pair, FF is less than if surfaces 110B and 116B form the pair.

To shift from the initial drive mode to the final drive mode, housing 19 engages and rotates, or displaces, wedge clutch plates 29*aw* in direction CD2 so that ramps 114 shift in direction CD2 with respect to ramps 108. In particular, surfaces 118 slide along surfaces 112 in direction CD2. The sliding of the surfaces cause surfaces 112 and 118 to lock and causes wedge clutch plates 29*aw* to press against housing 19 with more force, rotationally locking Input shaft 27, wedge clutch plates 29*aw*, and housing 19. As noted above, to enable housing 19 to rotate wedge clutch plates 29*aw*, there must be at least some frictional engagement of housing 19 with wedge clutch plates 29*aw* in the free wheel and initial drive modes (outer race rotates in direction CD1). If there is no frictional engagement or insufficient frictional engagement, housing 19 simply rotates in direction CD2 without displacing wedge clutch plates 29*aw*. That is, frictional force FF must be present to some degree.

One-way clutch 12 controls and reduces the magnitude of FF by controlling the number of surfaces 110 in contact with respective surfaces 116. The magnitude of force FF is proportional to the magnitude of F, which in turn is determined by the position of surfaces 110 in contact with respective surfaces 116. For example, as noted above, in the free wheel and initial drive modes, the closer the pair of surfaces noted above are to the gap in direction CD1, the less a magnitude of force FF opposing rotation of the outer race in direction CD1.

Thus, input shaft 27 and wedge clutch plates 29*aw* can be configured such that a specified pair or pairs of surfaces 110 and 116 are in contact in the free wheel and initial drive modes to produce a desired magnitude of FF, for example, the lowest magnitude of FF needed to enable one-way clutch 12 switching from the initial drive mode to the final drive mode. This configuration in turn advantageously reduces frictional losses for housing 19 in the initial drive mode, increasing the efficiency of clutch 14.

In an example embodiment, wedge clutch plates 29*aw* includes slots 126 and 128. Slots 126 include respective radially innermost ends 130 opening to IC1 and respective radially outermost ends 132 enclosed by wedge clutch plates 29*aw*. Slots 128 include respective radially outer most ends 134 opening to OC2 and respective radially innermost ends 136 enclosed by wedge clutch plates 29*aw*. In an example embodiment, slots 126 and 128 at least partially overlap in a circumferential direction, for example, CD1 or CD2.

In an example embodiment, slots 126 and 128 provide a mechanism for modulating the magnitude of F. As noted above, when wedge clutch plate 29*aw* is installed in housing 19, the elasticity of wedge clutch plate 29*aw* urges wedge clutch plate 29*aw* radially outward to contact housing 19 and exert force F on housing 19. Contact between surfaces 110 and 116 and the subsequent reaction of slots 126 and 128 acts to reduce the magnitude of F.

In the initial drive mode, compression of clutch plates 29*a*, 29*b* by actuator 11 is used to non-rotatably connect housing 19 and input shaft 27 up to a predetermined amount of torque being transmitted by the housing. In an example embodiment, there is slip between clutch plates 29*a*, 29*b* and 29*wa* in the initial drive mode. Once the predetermined amount of torque is transmitted by the housing, clutch assembly 14 is operated in the final drive mode. In an example embodiment, in the final drive mode: pressure on clutch plates 29*a*, 29*b* from actuator 11 is substantially removed (shaft 30 is displaced in direction AD2, opposite direction AD1) so that clutch plates 29*a*, 29*b* no longer non-rotatably connect housing 19 and input shaft 27; and wedge clutch plates 29*aw* alone non-rotatably connect housing 19 and input shaft 27. Removing the pressure reduces energy consumption and improves efficient. In an example embodiment, to transition from the initial drive mode to the final drive mode, shaft 30 is displaced in direction AD2 to enable relative rotation between plates 29*aw* and one or both of plates 29*a* and 29*b*. For example, the relative rotation is manifested by the rotation of plates 29*aw* with respect to input shaft 27 to slide ramps 108 and 114 as described above.

The final drive mode is only possible for rotation of housing 19 in a direction associated with forward travel of vehicle 1, for example direction CD2. For rotation of housing 19 in a direction associated with reverse travel of vehicle 1, for example direction CD1, one-way clutch 12 operates in the free-wheel mode. For a reverse mode and rotation of housing 19 in the direction associated with reverse travel, actuator 11 is used to compress and frictionally engage clutch plates 29*a* and 29*b* to non-rotatably connect housing 19 and input shaft 27.

The invention is not limited to the above described preferred exemplary embodiments. Conceivable are also modifications that are covered by the scope as stated in the following claims. Hence, it is also possible, for example, that a motor vehicle axle other than the rear axle 10 of the motor vehicle can be driven in a correspondingly engageable manner. In addition, the forward and reverse direction of travel of the motor vehicle and the corresponding operative direction of the freewheel means are interchangeable. Furthermore, at least three rolling members can be used in order to support the actuator shafts 30, 31 in an optimal way. Then the maximum torsion angle amounts to approximately 120° without suitable consideration of the tolerances.

What is claimed is:

1. An axle differential transmission for an engageably driven vehicle axle, comprising:
   an axis of rotation;
   a housing;
   a differential stage including at least one planetary gear assembly;
   an input shaft connected to the at least one planetary gear assembly; and,
   a clutch assembly including:
      an actuator;
      at least one first clutch plate non-rotatably connected to the input shaft;
      at least one second clutch plate non-rotatably connected to the housing; and,
      a one-way clutch including at least one wedge clutch plate, wherein:
   for a initial drive mode, the actuator is arranged to compress the at least one first clutch plate, the at least one second clutch plate, and the at least one wedge clutch plate to non-rotatably connect the housing and the input shaft; and,
   for a final drive mode, relative rotation between the housing and the input shaft in a first circumferential direction is arranged to non-rotatably connect the housing, the input shaft, and the at least one wedge plate.

2. The axle differential transmission of claim 1, wherein:
   for the initial drive mode, the actuator is arranged to axially compress the at least one first clutch plate, the at least one second clutch plate, and the at least one wedge clutch plate to non-rotatably connect the housing and the input shaft up to a predetermined amount of torque transmitted by the housing; and,
   for the final drive mode and the predetermined amount of torque, the actuator is arranged to release axial compression of the at least one first clutch plate, the at least one second clutch plate, and the at least one wedge clutch plate.

3. The axle differential transmission of claim 1, wherein:
   for the initial drive mode, a portion of the actuator is arranged to displace in a first axial direction, parallel to the axis of rotation, to displace the at least one first clutch plate, the at least one second clutch plate, and the at least one wedge clutch plate in the first axial direction; and,
   for the final drive mode, the portion of the actuator is arranged to displace in a second direction, opposite the first axial direction.

4. The axle differential transmission of claim 1, wherein:
   for the initial drive mode, the actuator is arranged apply pressure, in a first axial direction parallel to the axis of rotation, to the at least one first clutch plate, the at least one second clutch plate, and the at least one wedge clutch plate; and,
   for the final drive mode, the actuator is arranged to remove the axial pressure from the at least one first clutch plate, the at least one second clutch plate, and the at least one wedge clutch plate.

5. The axle differential transmission of claim 1, wherein for the final drive mode, torque from the housing is transmitted to the input shaft solely by the at least one wedge plate.

6. The axle differential transmission of claim 1, wherein for the final drive mode, the housing is arranged to rotate in a circumferential direction associated with forward travel for the engageably driven vehicle axle.

7. The axle differential transmission of claim 1, wherein to initiate the final drive mode, a portion of the actuator is arranged to displace to enable relative rotation between:
   the at least one clutch wedge plate; and,
   one of the at least one first clutch plate or the at least one second clutch plate.

8. The axle differential transmission of claim 1, wherein:
   for relative rotation between the housing and the input shaft in the second circumferential direction, opposite the first circumferential direction, the one-way clutch is arranged to operate in a free-wheel mode; and,
   in the free wheel mode, the housing is rotatable with respect to the input shaft and the at least one clutch wedge plate.

9. The axle differential transmission of claim 1, wherein for a reverse mode and relative rotation between the housing and the input shaft in the second circumferential direction, the actuator is arranged to compress the at least one first clutch plate, the at least one second clutch plate, and the at least one wedge clutch plate to non-rotatably connect the housing and the input shaft.

10. An axle differential transmission for an engageably driven vehicle axle, comprising:
   an axis of rotation;
   a housing;

a differential stage including at least one planetary gear assembly;
an input shaft connected to the at least one planetary gear assembly; and,
a clutch assembly including:
a mechanical ramp actuator;
at least one first clutch plate non-rotatably connected to the input shaft;
at least one second clutch plate non-rotatably connected to the housing; and,
a one-way clutch including at least one wedge clutch plate, wherein:
for a initial drive mode, the actuator is arranged to compress the at least one first clutch plate, the at least one second clutch plate, and the at least one wedge clutch plate to non-rotatably connect the housing and the input shaft; and,
for a final drive mode, relative rotation between the housing and the input shaft in a first circumferential direction is arranged to non-rotatably connect the housing, the input shaft, and the at least one wedge plate.

11. The axle differential transmission of claim 10, wherein:
the actuator includes first and second actuator shafts; and,
the first and second actuator shaft are respective hollow shafts arranged coaxially to the input shaft.

12. The axle differential transmission of claim 10, wherein:
the at least one planetary gear assembly includes first and second output sun gears; and,
the first and second output sun gears are coupled by a −1 gear ratio.

13. An axle differential transmission for an engageably driven vehicle axle, comprising:
a housing;
an input shaft; and,
a clutch assembly including:
an actuator;
at least one first clutch plate non-rotatably connected to the input shaft;
at least one second clutch plate non-rotatably connected to the housing; and,
a one-way clutch including at least one wedge clutch plate, wherein:
for a initial drive mode, the actuator is arranged to compress the at least one first clutch plate, the at least one second clutch plate, and the at least one wedge clutch plate to non-rotatably connect the housing and the input shaft up to a predetermined amount of torque transmitted by the housing; and,
for a final drive mode and the predetermined amount of torque, relative rotation between the housing and the input shaft in a first circumferential direction is arranged to non-rotatably connect the housing, the input shaft, and the at least one wedge plate.

14. The axle differential transmission of claim 13, wherein for the final drive mode and the predetermined amount of torque, the actuator is arranged to release axial compression of the at least one first clutch plate, the at least one second clutch plate, and the at least one wedge clutch plate.

15. The axle differential transmission of claim 13, wherein:
for the initial drive mode, a portion of the actuator is arranged to displace in a first axial direction, parallel to the axis of rotation, to displace the at least one first clutch plate, the at least one second clutch plate, and the at least one wedge clutch plate in the first axial direction; and,
for the final drive mode, the portion of the actuator is arranged to displace in a second direction, opposite the first axial direction.

16. The axle differential transmission of claim 13, wherein for the final drive mode, torque from the housing is transmitted to the input shaft solely by the at least one wedge plate.

17. The axle differential transmission of claim 13, wherein for the final drive mode, the housing is arranged to rotate in a circumferential direction associated with forward travel for the engageably driven vehicle axle.

18. The axle differential transmission of claim 13, wherein to initiate the final drive mode, a portion of the actuator is arranged to displace to enable relative rotation between:
the at least one clutch wedge plate; and,
one of the at least one first clutch plate or the at least one second clutch plate.

19. The axle differential transmission of claim 13, wherein:
for relative rotation between the housing and the input shaft in the second circumferential direction, opposite the first circumferential direction, the one-way clutch is arranged to operate in a free-wheel mode; and,
in the free wheel mode, the housing is rotatable with respect to the input shaft and the at least one clutch wedge plate.

20. The axle differential transmission of claim 13, wherein for a reverse mode and relative rotation between the housing and the input shaft in the second circumferential direction, the actuator is arranged to compress the at least one first clutch plate, the at least one second clutch plate, and the at least one wedge clutch plate to non-rotatably connect the housing and the input shaft.

* * * * *